April 15, 1941.   L. ALLGEYER   2,238,841
POWER TAKE-OFF FOR TRACTORS
Filed March 25, 1940   4 Sheets-Sheet 4
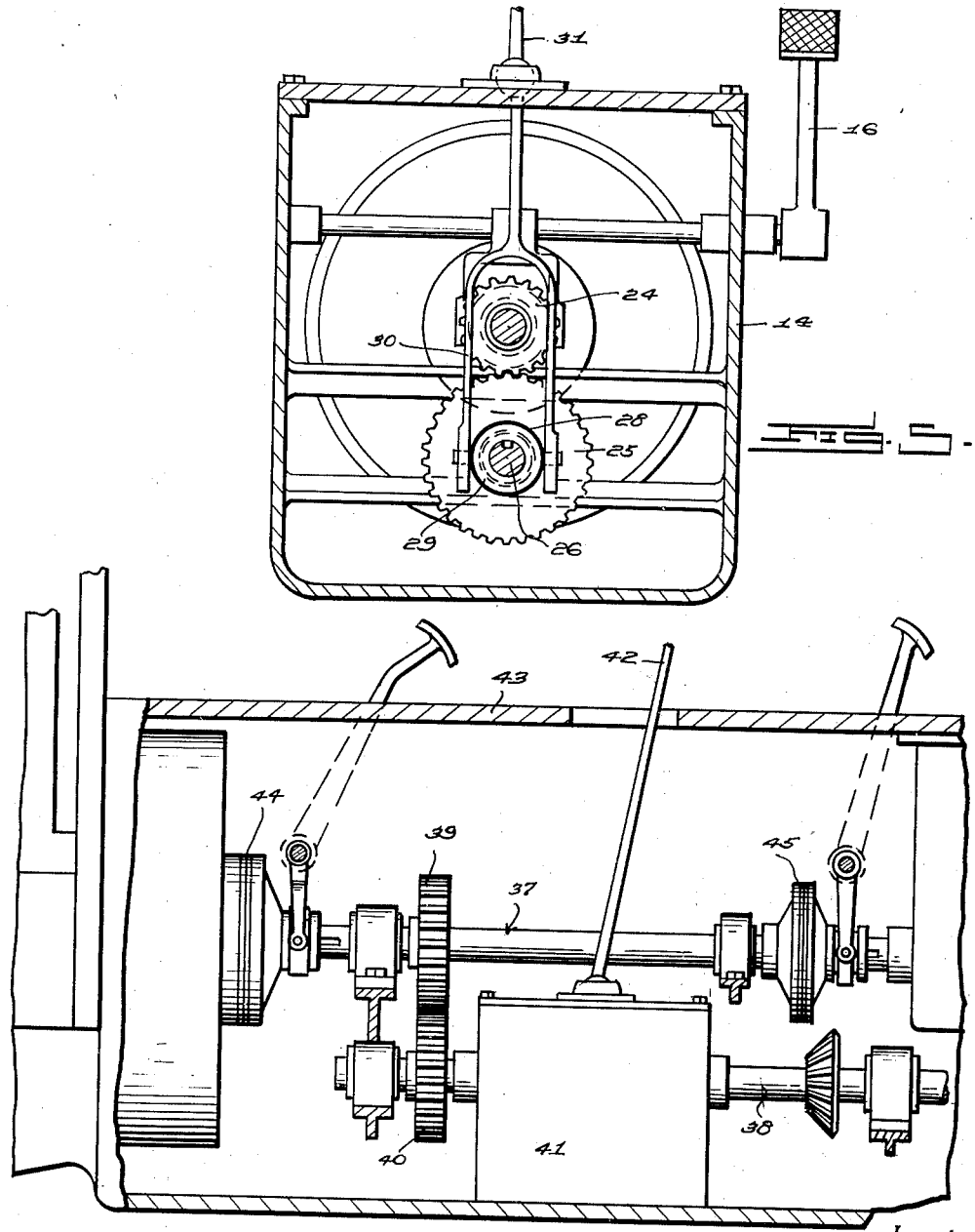
Inventor
LEO ALLGEYER,
By Clarence A. O'Brien
Attorney Patented Apr. 15, 1941

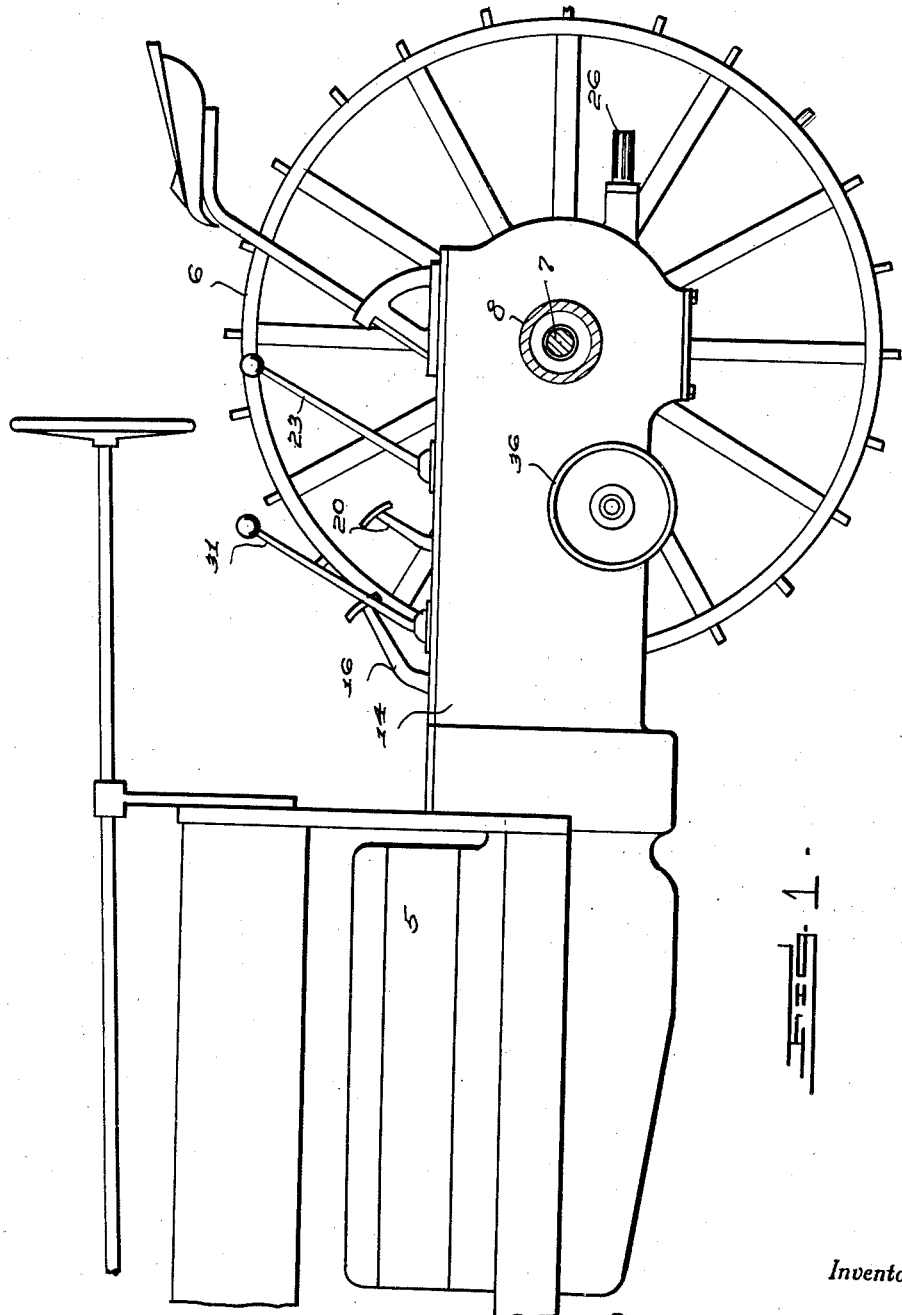

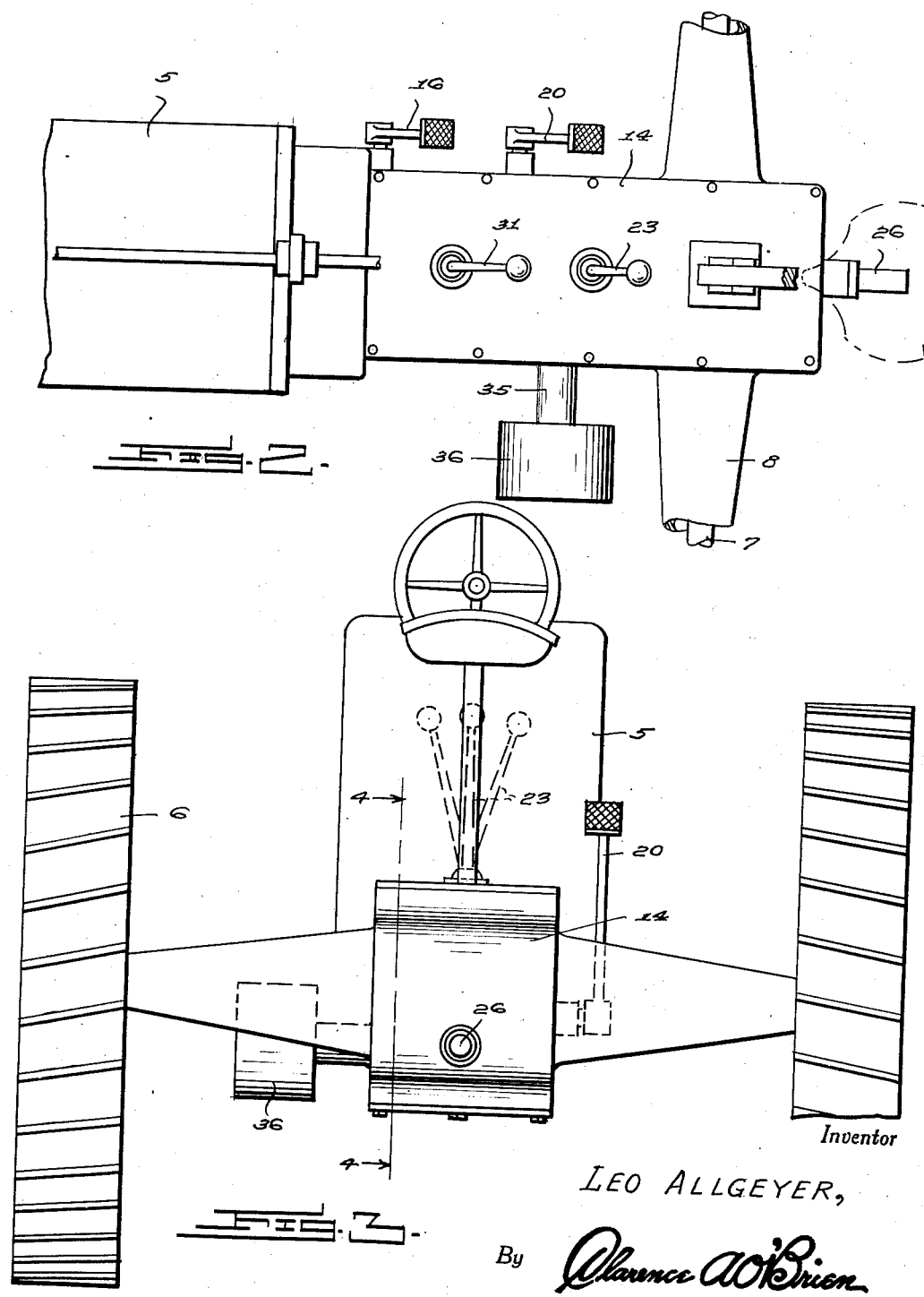

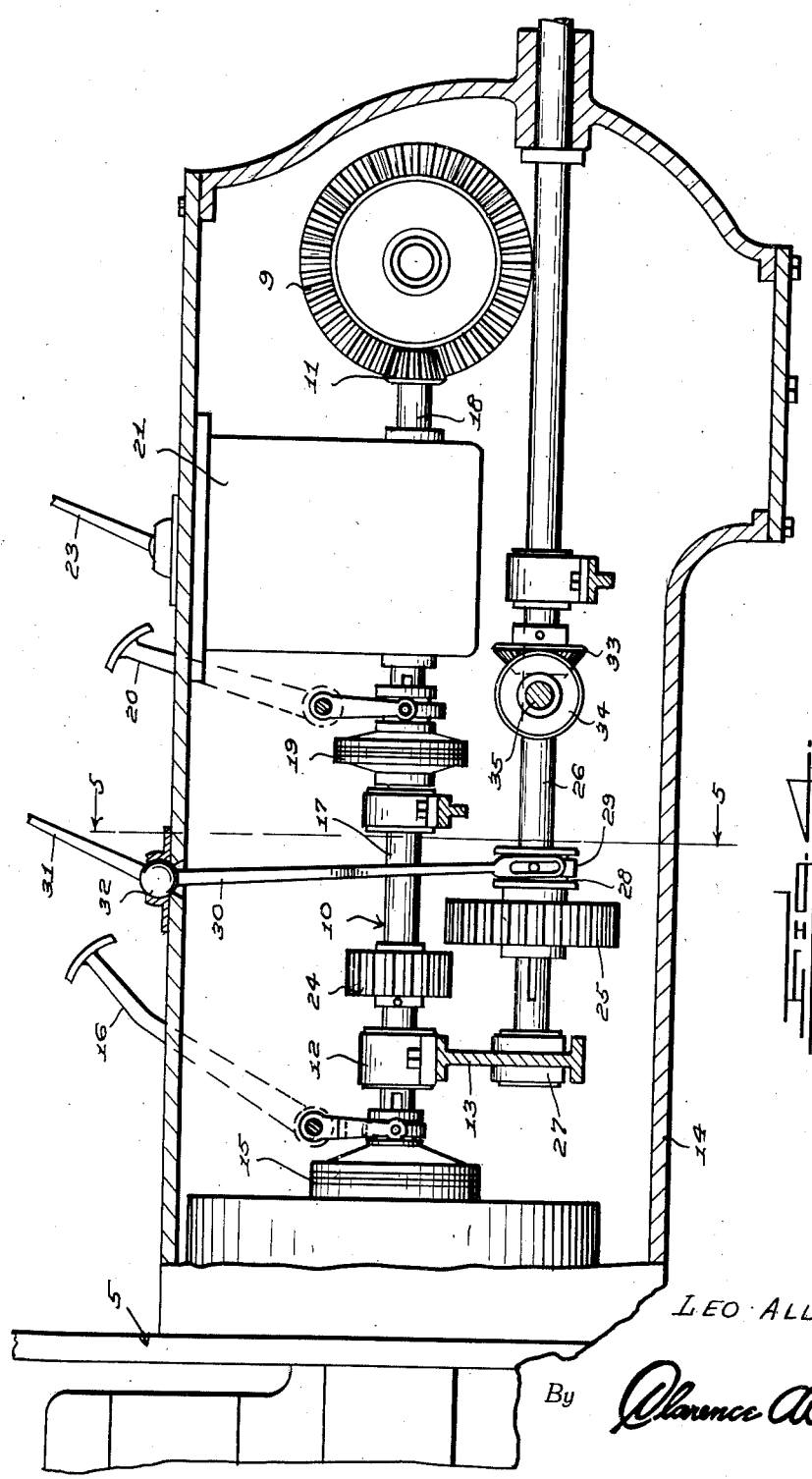

2,238,841

UNITED STATES PATENT OFFICE 2,238,841

POWER TAKE-OFF FOR TRACTORS

Leo Allgeyer, McKittrick, Mo., assignor of one-half to A. E. Miller, Rhineland, Mo.

Application March 25, 1940, Serial No. 325,869

2 Claims. (Cl. 74—11)

The present invention relates to power take-offs for tractors and similar motor driven vehicles and has for its primary object to provide a drive shaft for the tractor having a pair of clutch mechanisms interposed therein between the driven wheels of the tractor and the power plant and also to provide a power take-off drive shaft having a clutch mechanism adapted for connecting the power take-off shaft with the drive shaft of the vehicle at a point in advance of one of the clutch mechanisms for the drive shaft in order that the power take-off shaft may be operated while the vehicle is stationary, or vice versa, and also providing a drive connection whereby the vehicle may be driven simultaneously with the operation of the power take-off shaft.

A further object is to provide a power take-off drive connection of this character of simple and practical construction, which is efficient and reliable in performance, relatively inexpensive to manufacture and install in operation and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1 is a side elevational view of the rear end of a tractor constructed in accordance with my invention and with parts broken away and shown in section, Figure 2 is a fragmentary top plan view, Figure 3 is a rear elevational view, Figure 4 is a vertical longitudinal sectional view taken substantially on a line 4—4 of Figure 3, Figure 5 is a vertical transverse sectional view taken substantially on a line 5—5 of Figure 4, and Figure 6 is a fragmentary longitudinal sectional view through the clutch housing showing a modified form of drive connection for the power take-off drive shaft.

Referring now to the drawings in detail the numeral 5 designates the power plant of the tractor which includes the driven rear wheels 6 mounted on the axle 7 which are journalled in the axle housing 8, the axles being driven by the differential ring gear 9. The drive shaft 10 forms the operative connection between the power plant and the ring gear 9 through the use of a drive pinion 11 on the rear end of the shaft, the shaft being suitably journalled in bearings 12 mounted on supports 13 within the housing 14. The housing encloses the differential mechanism 9 as well as the entire drive shaft 10.

The drive shaft, at its front end, is connected to the power plant by means of a disk clutch mechanism 15 of conventional construction and operated by means of a foot pedal 16 positioned at one side of the housing. The drive shaft 10 includes a front section 17 and a rear section 18 arranged in longitudinal alignment and operatively connected by means of a disk-type clutch mechanism 19, which is likewise controlled by means of a foot pedal 20 also positioned at one side of the housing 14 rearwardly of the clutch pedal 16. The rear section 18 of the shaft is journalled in the opposite walls of a transmission gear housing 21, as more clearly shown in Figure 4 of the drawings, the shaft section extending from front to rear through the transmission housing, the speed of the shaft section being controlled by the usual transmission mechanism operatively mounted in the housing 21, and selectively controlled by means of the usual transmission gear shift lever 23 projecting upwardly from the housing 14.

The front shaft section 17 also has a gear 24 keyed thereon and in the form of the invention illustrated in Figures 1 to 5 inclusive, this gear is engageable by a sliding gear 25 mounted on the power take-off drive shaft 26 also journalled in bearings 27 in the housing 14. The gear 25 is actuated by means of a collar 28 with which a clutch yoke 29 is engageable, the yoke having an operating rod 30 projecting upwardly therefrom which is operated by a gear shift lever 31 projecting upwardly above the housing 14 by means of a ball and socket connection 32.

The power take-off shaft 26 projects rearwardly from the housing 14 and secured to the shaft within the housing is a bevel gear 33 engaged by a similar gear 34 secured to a transversely extending shaft 35 which projects through one side of the housing 14 and provided with a power take-off drive pulley 36.

In the operation of the device with the clutch mechanisms 15 and 19 normally engaged, power will be transmitted to the rear drive shaft section 18 and by the engagement of the transmission gears 22 the wheels of the tractor will be driven. The power take-off shaft 26 may be utilized to connect various types of machinery to the tractor for driving said machinery simultaneously with the driving of the tractor by throwing out the clutch 15 and engaging the gears 24 and 25, after which the clutch mechanism 15 may be again moved into engagement and the shafts 10 and 26 will then be connected for simultaneous operation.

If it is desired to continue the operation of the shaft 26 while the tractor remains stationary, the clutch mechanism 19 may then be disengaged.

In the form of the invention illustrated in Figure 6 of the drawings, the drive shaft is designated at 37 and the power take-off shaft at 38, said shaft being constantly engaged by gears 39 and 40 respectively. In order to disengage the shaft 38 from the drive shaft 37 a conventional form of transmission gearing mechanism 41 is provided for the power take-off shaft 38, said transmission mechanism being controlled by a gear shift lever 42 projecting upwardly through the housing 43. The drive shaft 37 is likewise provided with the front disk clutch mechanism 44 and the rear disk clutch mechanism 45 and otherwise the mechanism is constructed similar to that described with respect to Figures 1 to 5 inclusive.

It is believed the details of construction, advantages and manner of operation of the device will be readily understood from the foregoing without further detailed explanation.

Having thus described the invention, what I claim is—

1. A power take-off for motor driven vehicles comprising in combination, a drive shaft for the vehicle including front and rear shaft sections, a variable speed transmission for the rear shaft section, a clutch device between the motor and the front shaft section, a clutch device between the front and rear shaft sections in advance of the transmission, a power take-off shaft, a gear on said front shaft section, and a gear on said power take-off shaft, said last named gear being movable into and out of engagement with the first named gear.

2. A power take-off for motor driven vehicles comprising in combination, a drive shaft for the vehicle including front and rear shaft sections, a variable speed transmission for the rear shaft section, a clutch device between the motor and the front shaft section, a clutch device between the front and rear shaft sections in advance of said transmission, a power take-off shaft, a gear on said front shaft section, a gear slidably mounted on said power take-off shaft and means for moving said last-named gear into and out of operative engagement with said first-named gear, and a laterally extending power take-off shaft operatively connected with said first-named power take-off shaft.

LEO ALLGEYER.